(12) United States Patent
Melen

(10) Patent No.: US 6,674,892 B1
(45) Date of Patent: Jan. 6, 2004

(54) CORRECTING AN EPIPOLAR AXIS FOR SKEW AND OFFSET

(75) Inventor: Roger D. Melen, Los Altos Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/431,418

(22) Filed: Nov. 1, 1999

(51) Int. Cl.[7] .................................................. G06K 9/00
(52) U.S. Cl. ........................ 382/154; 382/285; 382/289; 348/42
(58) Field of Search ................................. 382/154, 284, 382/285, 289; 345/419, 420; 348/43, 46, 42; 356/12

(56) References Cited

U.S. PATENT DOCUMENTS

| | | | |
|---|---|---|---|
| 6,175,648 B1 * | 1/2001 | Ayache et al. | 382/154 |
| 6,191,809 B1 * | 2/2001 | Hori et al. | 348/45 |
| 6,215,898 B1 * | 4/2001 | Woodfill et al. | 348/47 |

OTHER PUBLICATIONS

Papadimitriou et al., "Epipolar Line Estimation and Rectification for Stereo Image Pairs", Apr. 1996, IEEE Transactions on Image Processing, vol. 5, No. 4, pp. 672–676.*

* cited by examiner

*Primary Examiner*—Yon J. Couso
*Assistant Examiner*—Aaron Carter
(74) *Attorney, Agent, or Firm*—Fitzpatrick, Cella, Harper & Scinto

(57) ABSTRACT

Cameras (10, 12) produce first and second images (14, 16) of an object (18) from different viewpoints. An image partitioning module (54) partitions the images (14, 16) into a plurality of vertically striped regions (70), such that each region (70) of the first image (14) corresponds to a region (70) of the second image (16). A region alignment module (55) vertically shifts a region (70) of the first image (14) in a direction calculated to vertically align a portion (30) of the region (70) with a substantially matching portion (32) of the corresponding region (70). A disparity calculation module (62) calculates at least one disparity value between at least a portion (30) of the vertically shifted region (70) and at least a portion (32) of the corresponding region (70).

24 Claims, 15 Drawing Sheets

CORRECTING AN EPIPOLAR AXIS FOR SKEW AND OFFSET

TECHNICAL FIELD

The present invention relates generally to stereo imaging, and more particularly, to techniques for correcting an epipolar axis for skew and offset in order to approximate a horizontal axis in disparity calculations.

BACKGROUND ART

The art of stereo imaging involves the generation and analysis of at least two images of an object from different points of view. Typically, the two images correspond to left and right images generated by cameras positioned along, and orthogonal to, at least two viewpoints on a horizontal axis. Collectively, the left and right images are called a stereo image pair.

The left and right images of a stereo image pair may be analyzed to yield disparity data. Disparity is the amount of translation along a conceptual epipolar axis that all objects move along in response to changing the image creation viewpoint. If the cameras are perfectly aligned, both vertically and rotationally, the epipolar axis is identical to the horizontal axis.

For example, objects in the left view of a stereo image pair appear to be further to the right along the epipolar axis than the same objects in the right image. Moreover, objects closer to the cameras will appear to be horizontally shifted along the epipolar axis to a greater degree than objects farther from the cameras. In extreme cases, an object in the distant horizon, such as the sun, may not appear to shift at all, whereas objects immediately in front one camera may appear centered in one image but not even appear in the other image.

Disparity data is useful in numerous applications ranging from distance calculation to edge detection. For example, using well known techniques, the degree of disparity between the location of an object in two images may be used to calculate the distance of the object from the cameras.

Moreover, disparity data may be used to locate the edges of an object represented in a stereo image pair. Because the background of an object is farther away from the cameras than the object itself, the background exhibits a lesser degree of disparity than does the object. Consequently, the difference in disparity distinguishes the edges of the object from the background.

In general, disparity is calculated by matching blocks of picture elements (pixels) along the same horizontal rows of the left and right images. This technique relies, sometimes correctly, on the assumption that the epipolar axis is approximately equal to the horizontal axis. Once the matching blocks are identified, the amount of horizontal translation, and hence, the degree of disparity, may be determined.

Unfortunately, the horizontal axis is often a poor approximation of the epipolar axis. For example, the left camera may be slightly rotated with respect to the right camera, resulting in a left image that is skewed with respect to the right image. Likewise, the left camera may be slightly higher or lower than the right camera, resulting in a left image that is vertically offset from the right image.

Skew and offset cause the epipolar axis to deviate from the horizontal axis. Thus, if blocks of pixels are compared along the same horizontal rows in the left and right images, no matching blocks are found. Without a compensating calculation, the degree of disparity cannot be determined.

Conventional methods for correcting an epipolar axis for skew and offset require vast amounts of calculation. For example, using standard techniques, the precise amount of skew and offset for each image may be determined, and appropriate transformations, including image rotations and translations, may be performed. However, these transformations often require days of CPU time for high-resolution images and make real-time disparity calculations impracticable.

Accordingly, a need exists for an improved system and method for quickly compensating for skew and offset of an epipolar axis to allow for rapid determination of disparity values.

DISCLOSURE OF INVENTION

The present invention solves the foregoing problems by providing an improved system and method for correcting an epipolar axis for skew and offset in order to approximate a horizontal axis in disparity calculations.

In one aspect of the invention, cameras (10, 12) produce first and second images (14, 16) of an object (18) from different viewpoints. An image partitioning module (54) partitions the images (14, 16) into a plurality of vertically striped regions (70), such that each region (70) of the first image (14) corresponds to a region (70) of the second image (16). A region alignment module (55) vertically shifts a region (70) of the first image (14) in a direction calculated to vertically align a portion (30) of the region (70) with a substantially matching portion (32) of the corresponding region (70).

In another aspect of the invention, the region alignment module (55) includes a block matching module (56), an offset calculation module (58), and a region shifting module (60). Where a first region (70) of the first image (14) corresponds to a second region (70) of the second image (16), the block matching module (56) identifies a portion (32) of the second region (70) that substantially matches a portion (30) of the first region (70). The offset calculation module (58) calculates a vertical offset between the substantially matching portions (30,32). The region shifting module (60) vertically shifts the first region (70) according to the calculated vertical offset in order to vertically align the substantially matching portions (30, 32) of the first and second regions (70).

In yet another aspect of the invention, a computer-implemented method includes the steps of partitioning the first and second images (14,16) into a plurality of vertically striped regions (70) and vertically shifting a region (70) of the first image (14) in a direction calculated to vertically align a portion (30) of the region (70) with a substantially matching portion (32) of the corresponding region (70).

In still another aspect of the invention, the vertically shifting step includes the steps of identifying a portion (32) of the second region (70) that substantially matches a portion (30) of the first region (70); calculating a vertical offset between the substantially matching portions (30, 32); and vertically shifting the first region (70) according to the calculated vertical offset in order to vertically align the substantially matching portions (30, 32) of the first and second regions (70).

In another aspect of the invention, an article of manufacture comprises a program storage medium readable by a processor (42) and embodying one or more instructions executable by the processor (42) to perform the above-described method.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

A preferred embodiment of the invention is now described with reference to the Figures, where like reference numbers indicate identical or functionally similar elements.

Figure 1:
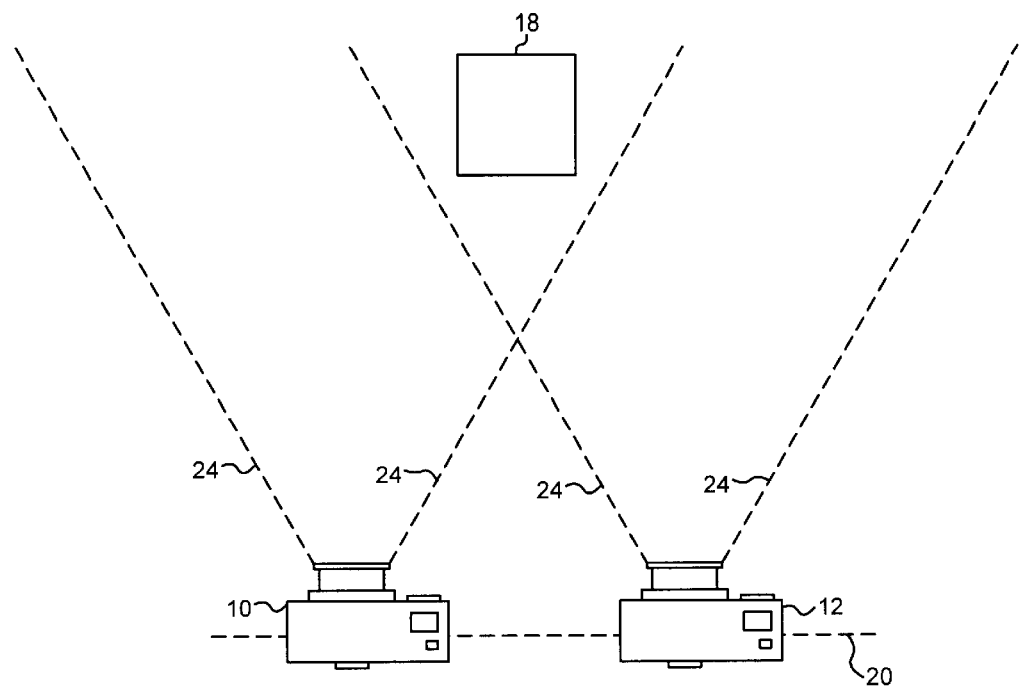
FIG. 1 is a top plan view of two cameras and an object according to one embodiment of the invention.
Figure 2:
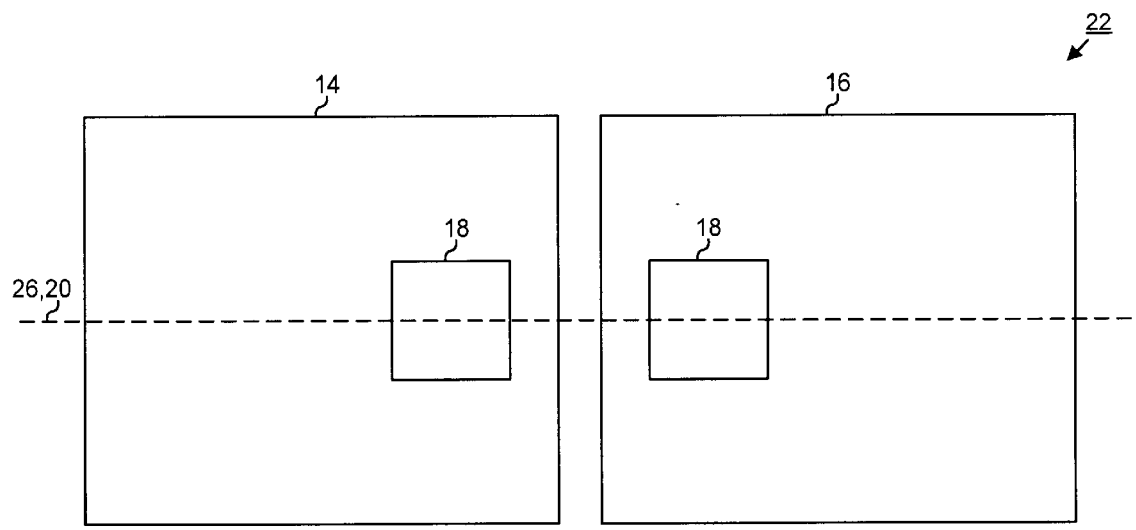
FIG. 2 is an illustration of a stereo image pair according to one embodiment of the invention.

Referring now to FIGS. 1 and 2, left and right cameras 10, 12 generate left and right images 14, 16, respectively, of an object 18. The cameras 10, 12 preferably generate the images 14, 16 at two different viewpoints along, and orthogonal to, a horizontal axis 20. While two cameras 10, 12 are depicted herein, a single camera, moved between two viewpoints, may perform the same function.

In one embodiment, the images 14,16 comprise data arrays including rows and columns of picture elements (pixels). The images 14,16 may comprise bi-level (black and white) or color pixels represented by one or more data bits. Collectively, the left and right images 14,16 form a stereo image pair 22.

In one embodiment, each camera 10, 12 includes a charged-coupled device (CCD) capable of generating a bit-mapped (raster) image. Digital cameras are well known and widely available in the art. Alternatively, the cameras 10, 12 may comprise conventional still or video cameras, the output of which is preferably digitized in order to generate the bit-mapped images. For example, a scanning device (not shown) may convert film negatives or photographs into bit-mapped images. Likewise, a video capture device (not shown) may capture and digitize a frame of a video stream.

Dashed lines 24 indicate the fields of view of the cameras 10, 12, which are preferably identical. Accordingly, the object 18 in the left image 14 is horizontally shifted to the right, while the same object 18 in the right image 16 is horizontally shifted to the left.

The line along which the object 18 is shifted in each image 14,16 is called the epipolar axis 26. If the cameras 10, 12 are precisely aligned, both vertically and rotationally, the epipolar axis 26 is identical to the horizontal axis 20.

Disparity is the amount of translation along the epipolar axis 26 that all objects move in response to changing the image creation viewpoint. Disparity data is useful in numerous applications ranging from distance calculation to edge detection. For instance, using a well-known formula, the degree of disparity between the location of the object 18 in the two images 14, 16 may be used to calculate the distance of the object 18 from the cameras 10, 12.

Figure 3:
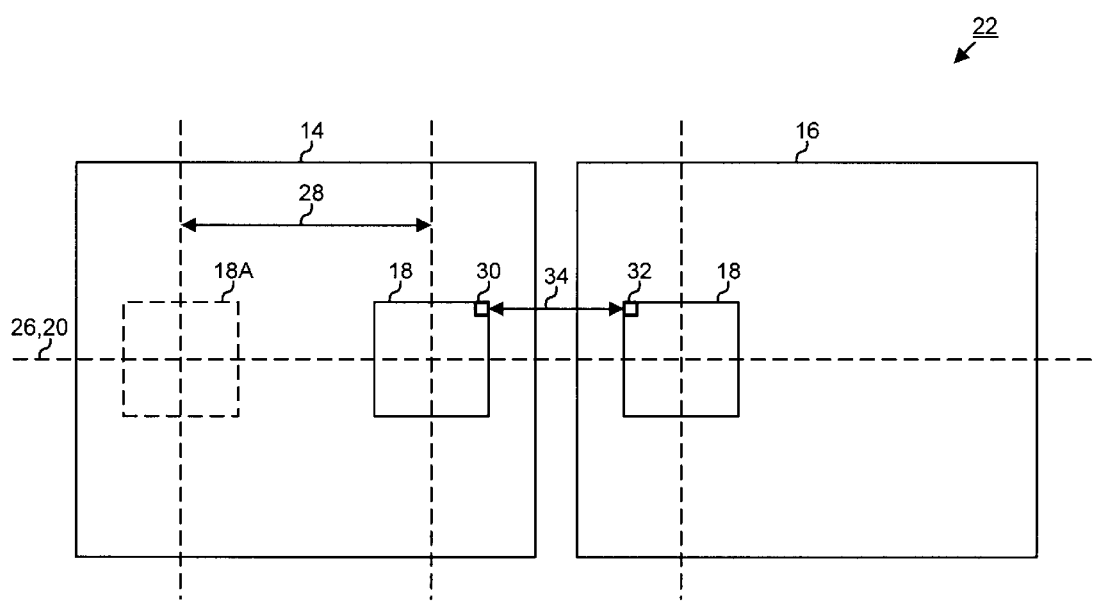
FIG. 3 is an illustration of a disparity calculation within a stereo image pair according to one embodiment of the invention.

Referring to FIG. 3, the degree of disparity associated with the object 18 in the images 14,16 is illustrated by line 28. The object 18A (shown by dashed lines) in the left image 14 indicates the location of the object 18 within the right image 16. The degree of disparity is the amount of translation (line 28) along the epipolar axis 26 between the object 18 and the object 18A.

A high degree of disparity, as shown in FIG. 3, indicates that the object 18 is relatively close to the cameras 10, 12. A distant object, however, such as the sun, would evidence little or no disparity.

In general, disparity is calculated by matching corresponding blocks 30,32 of pixels along the same horizontal rows (indicated by line 34) of the left and right images 14, 16. This technique relies on the assumption that the horizontal axis 20 closely approximates the epipolar axis 26. Once the matching blocks 30, 32 are identified, the amount of horizontal translation, and hence, the degree of disparity, may be determined.

Figure 4:
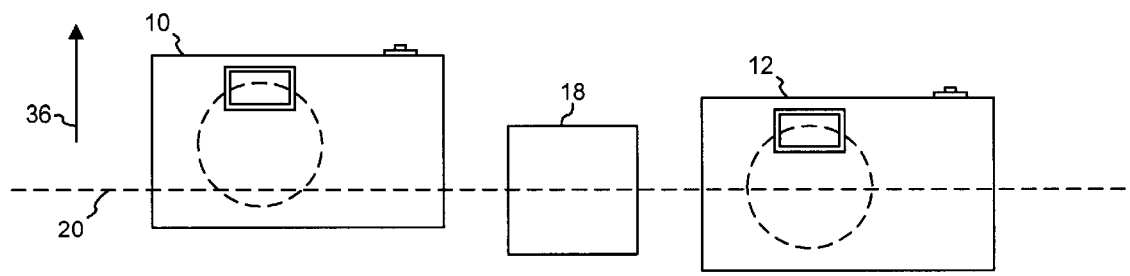
FIG. 4 is a rear elevation view of two cameras and an object according to one embodiment of the invention.
Figure 5:
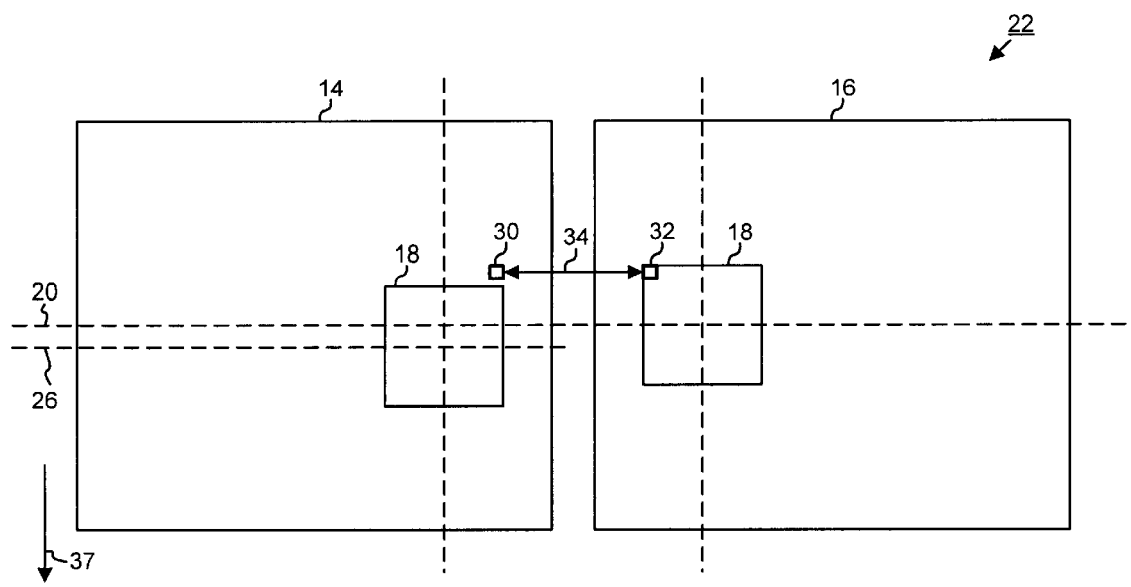
FIG. 5 is an illustration of an offset epipolar axis within stereo image pair according to one embodiment of the invention.

Unfortunately, the horizontal axis 20 is sometimes a poor approximation of the epipolar axis 26. As shown in FIGS. 4 and 5, the left camera 10 may be slightly higher than the right camera 12 due, for example, to a poorly adjusted tripod (not shown). Because the left camera 10 is vertically offset from the horizontal axis 20 in the direction of line 36, the object 18 in the left image 14 is slightly lower than the object 18 in the right image 16. Consequently, the epipolar axis 26 in the left image 14 is no longer identical to the horizontal axis 20, but is vertically offset from the horizontal axis 20 in the direction of line 37.

A difficulty arises, however, in performing disparity calculations where the epipolar axis 26 is not aligned with the horizontal axis 20. As noted above, disparity is generally calculated by matching blocks 30,32 of pixels along the same horizontal rows of the left and right images 14, 16. As illustrated by FIG. 5, when the epipolar axis 26 is sufficiently offset from the horizontal axis 20, a block 30 may not match a block 32 along the same horizontal line 34. Thus, without a compensating calculation, it is impossible to determine the degree of disparity associated with the object 18.

Figure 6:
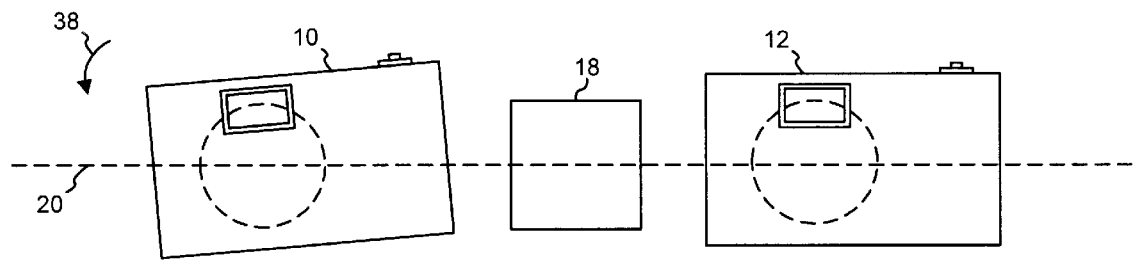
FIG. 6 is a rear view of two cameras and an object according to one embodiment of the invention.
Figure 7:
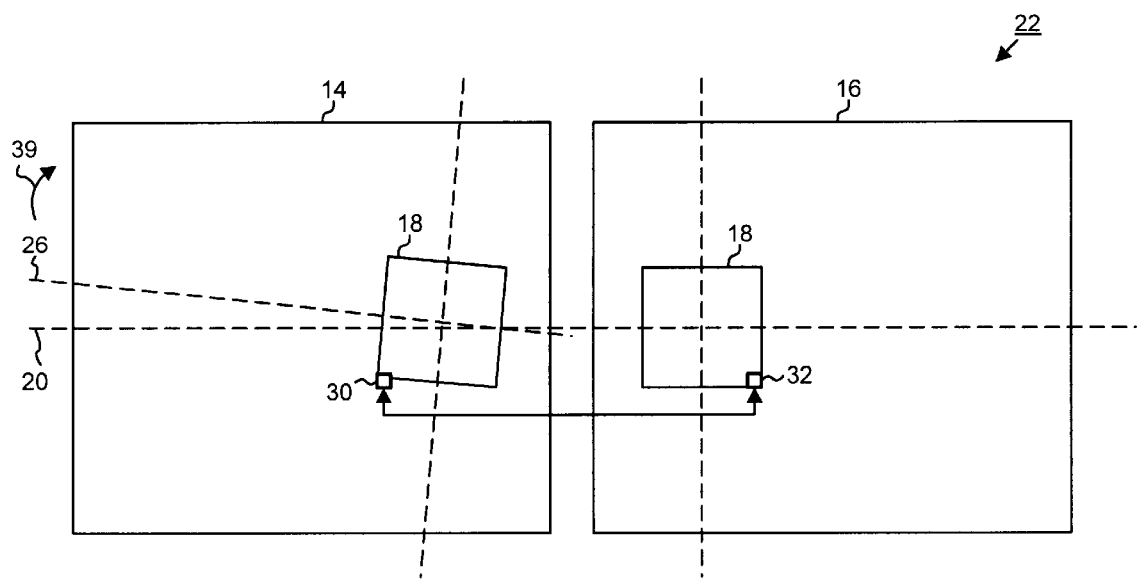
FIG. 7 is an illustration of a skewed epipolar axis within a stereo image pair according to one embodiment of the invention.

A similar situation is observed in FIGS. 6 and 7, wherein the left camera 10 is rotated slightly with respect to the right camera 12 in the direction of line 38. As a result, the object 18 in the left image 14 is rotated in the opposite direction by a similar degree. Moreover, the epipolar axis 26 in the left image 14 is no longer identical to the horizontal axis 20, but is skewed with respect to the horizontal axis 20 in the direction of line 39.

Again, a difficulty arises when performing disparity calculations. As illustrated in FIG. 7, a block 30 may not match a block 32 along the same horizontal rows of the left and right images 14, 16. Thus, without a compensating calculation, it is impossible to determine the degree of disparity.

Conventional approaches attempt to precisely determine the skew and offset of the epipolar axis 26 and perform compensating transformations, including rotations and translations, on the left and right images 14, 16. However, such transformations require a vast number of calculations and make real-time disparity determinations impracticable.

As described in greater detail below, the present invention introduces an improved method for correcting an epipolar axis 26 for skew and offset that operates in essentially linear, i.e. O(N), time, greatly reducing the processing required to correct an epipolar axis 26. Moreover, the methods of the present invention do not require complex calculations, such as image rotations and the like. Accordingly, the system of the present invention is suitable for implementation within a relatively simple hardware device.

Figure 8:
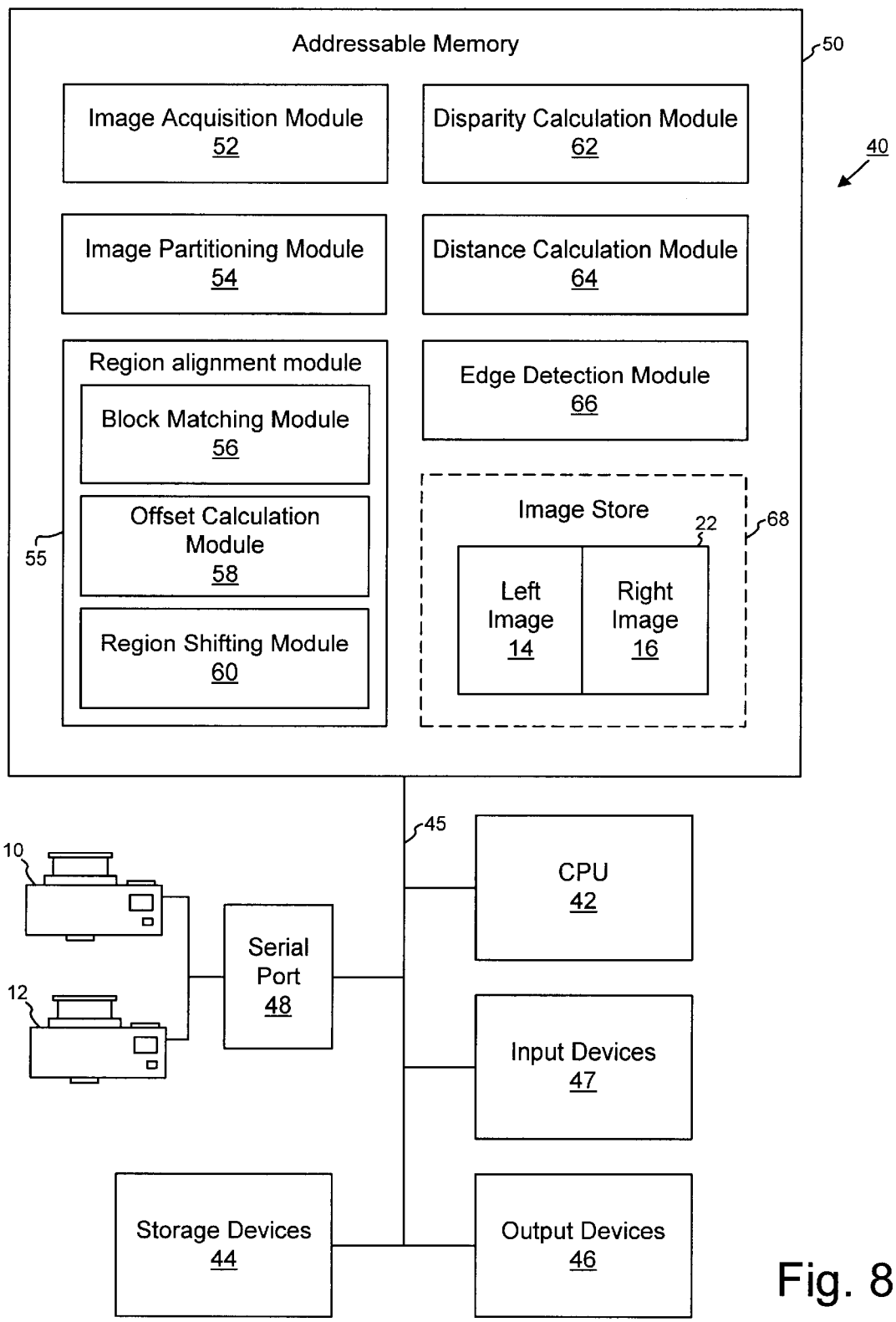
FIG. 8 is a system for correcting an epipolar axis according to one embodiment of the invention.

Referring now to FIG. 8, a system 40 for correcting an epipolar axis 26 for skew and offset is preferably implemented in the context of software modules within a conventional personal computer. Other implementations are possible, however. For example, the modules may be distributed among a plurality of computers within a network, or may be implemented as hardware devices within an embedded system. Although the modules are described herein as separate functional units, various modules may be combined or integrated into a single software application or device. Likewise, the functionality of one module may be implemented by two or more modules.

A central processing unit (CPU) 42 executes software instructions and interacts with the other components of the system 40 to perform the methods of the present invention. Storage devices 44, such as hard disk drives, optical drives, or other suitable mass storage devices, provide long-term storage of data and software programs. In one embodiment, the storage devices 44, as well as the other components of the system 40, are coupled to the CPU 42 via a system bus 45.

Output devices 46, such as monitors or printers, display text and graphics under the control of the CPU 42. Input devices 47, such mice or keyboards, facilitate user control of the system 40. In one embodiment, the left and right cameras 10,12 are coupled to the system bus 32 via a conventional interface, such as an RS-232 serial port 48.

An addressable memory 50 stores software instructions to be executed by the CPU 42. In one embodiment, the memory is implemented using one or more standard memory devices, such as random access memory (RAM) and read-only memory (ROM).

In one embodiment, the memory 50 includes a plurality of software modules, including an image acquisition module 52, an image partitioning module 54, a region alignment module 55 (including a block matching module 56, an offset calculation module 58, a region shifting module 60), a disparity calculation module 62, a distance calculation module 64, and an edge detection module 66. Each of the foregoing modules are described in greater detail below with respect to FIG. 9.

In one embodiment, the memory 50 also includes an image store 68 for housing a plurality of stereo image pairs 22 generated by the cameras 10, 12 or by other image sources. As previously described, each stereo image pair 22 preferably comprises at least a left image 14 and a right image 16.

In one embodiment, the memory 50 also includes an operating system (not shown) for managing and providing system resources to the above-mentioned software modules. Preferably, Windows 98®, available from Microsoft Corporation, is used, although a variety of other operating systems, such as Windows NT®, MacOS 8®, and UNIX®, may be used within the scope of the present invention.

Figure 9:
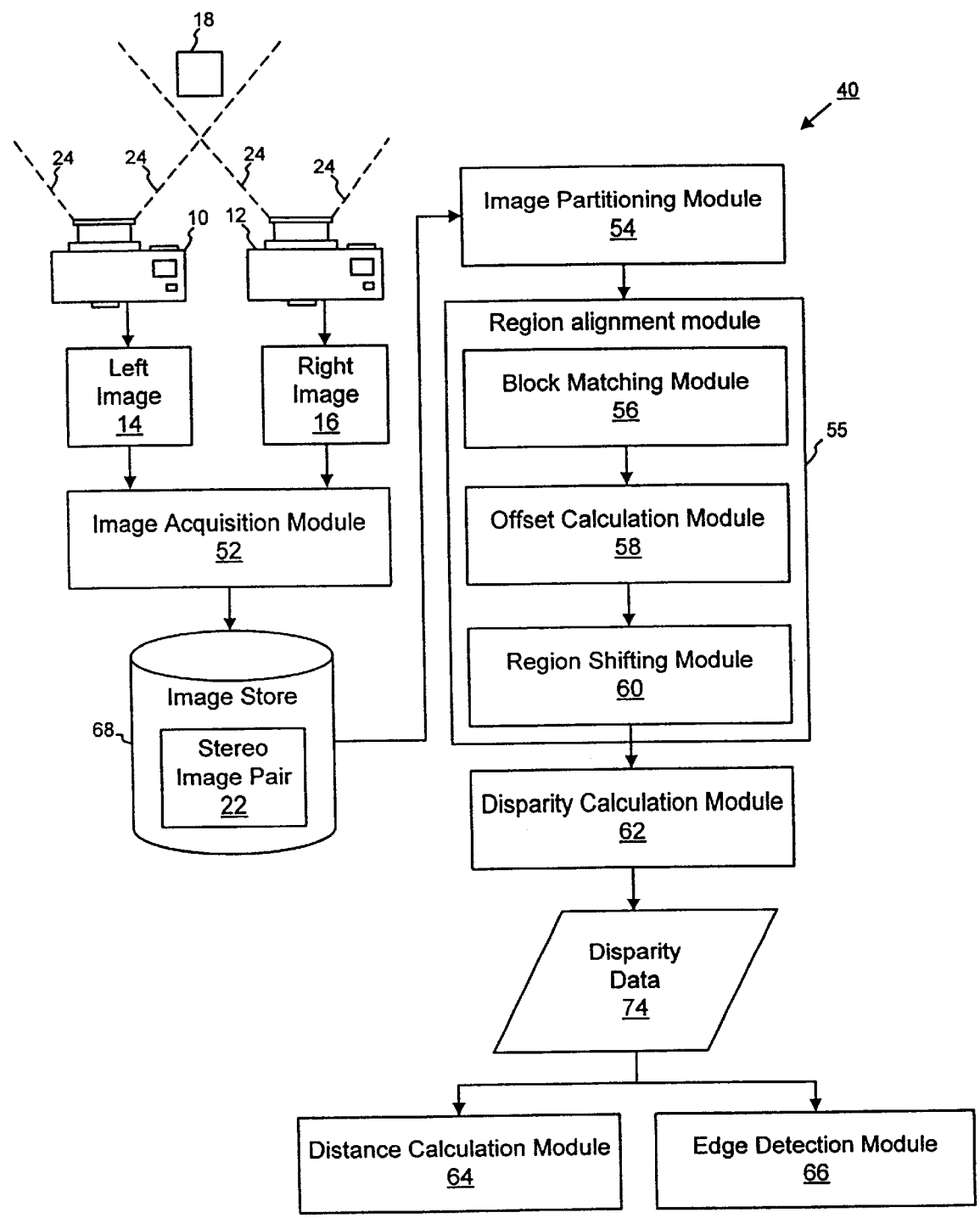
FIG. 9 is a schematic block diagram of the flow of data within a system for correcting an epipolar axis according to one embodiment of the invention.

FIG. 9 is an illustration of the flow of data through the various components of the system 40. Initially, the left and right cameras 10,12 generate the left and right images 14,16 of the object 18. As previously noted, the images 14,16 are preferably bit-mapped (raster) images including rows and columns of pixels. In one embodiment, the images 14,16 are temporarily stored within a local memory (not shown) of each camera 10, 12. However, in an alternative embodiment, the cameras 10, 12 may transmit the image data directly to the image store 68.

In one embodiment, the image acquisition module 52 retrieves the left and right images 14, 16 from the respective cameras 10, 12. Preferably, the image acquisition module 52 is a TWAIN-compliant data source manager that communicates with a low-level device driver (not shown) of the cameras 10, 12 to retrieve the image data via the serial port 48. However, the image acquisition module 52 may be implemented in a variety of different ways within the scope of the invention.

After the images 14, 16 are retrieved, the image acquisition module 52 preferably stores the images 14, 16 in the image store 68 as a stereo image pair 22. In an alternative embodiment, the image acquisition module 52 may provide the images 14,16 directly to the image partitioning module 54.

Figure 10:
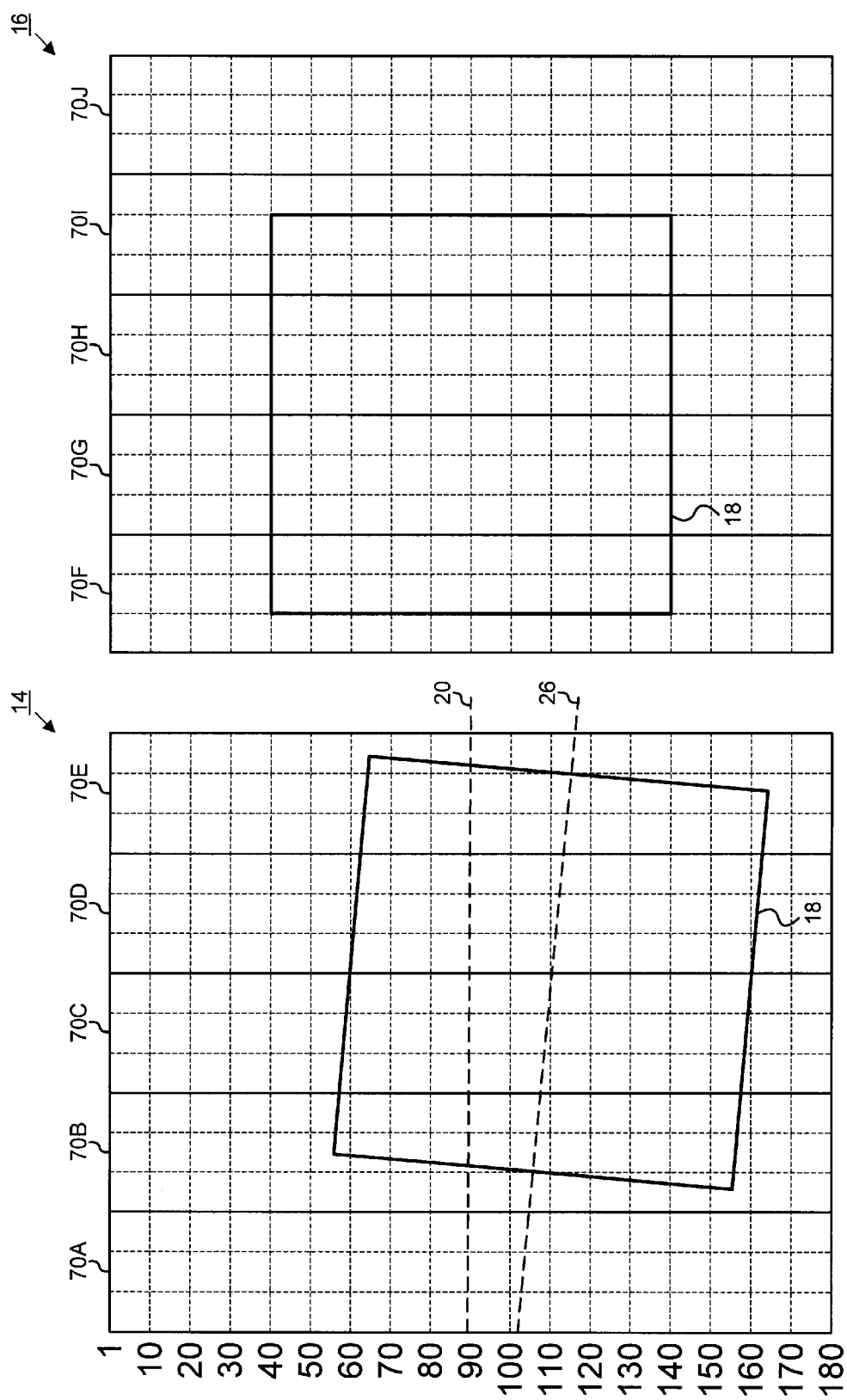
FIG. 10 is an illustration of a skewed and offset epipolar axis within a stereo image pair according to one embodiment of the invention.

Next, the image partitioning module 54 preferably retrieves a stereo image pair 22 from either the image store 68 or the image acquisition module 52. Thereafter, the image partitioning module 54 partitions each of the component images 14,16 into a plurality of vertically striped regions 70, as illustrated in FIG. 10. While the following description makes reference to "vertical" and "horizontal" directions, it should be recognized that the directions may be reversed in one embodiment.

In the depicted embodiment, the left and right images 14,16 are data arrays comprising 180 rows and 150 columns of pixel data. Of course, the images 14,16 may be smaller or larger as needed. Each row and column is preferably associated with a number that functions as a vertical and horizontal coordinate, respectively. For example, the row numbers are illustrated in FIG. 10 to the left of image 14. Dashed lines indicate every tenth row and column.

In one embodiment, the vertically striped regions 70 are thirty pixels wide. Thus, the image partitioner 54 partitions both the left and right image 14, 16 into five regions 70, numbered 70A–E and 70F–J, respectively.

The precise number and width of the regions 70, however, is not essential to the invention. A greater number of regions 70 typically results in a more precise correction of the epipolar axis 26, yielding more accurate disparity data. However, partitioning the images 14, 16 into too many regions 70 may actually reduce accuracy due to the inherent difficulties in matching small blocks of pixels. Moreover, a greater number of regions 70 results in more calculations and a slower process of axis correction.

In one embodiment, each region 70 of the left image 14 corresponds to region 70 of the right image 14 of identical dimensions. When the images 14,16 are viewed side-by-side, each region 70 of the left image 14 preferably corresponds to a "mirrored" region 70 of the right image 16. In other words, the region 70A corresponds to the region 70J, the region 70B corresponds to the region 70I, the region 70C corresponds to the region 70H, and so forth.

In one embodiment, the partitioning is logical rather than physical. In other words, rather than splitting the images 14, 16 into a plurality of discrete image fragments, the partitioning module 54 merely defines column boundaries that logically divide the images 14, 16 into vertically striped regions 70.

As shown in FIG. 10, the object 18 in the left image 14 is shifted downward by twenty pixels with respect to the object 18 in the right image 16. In addition, the object 18 in the left image 14 is rotated five degrees clockwise with respect to the object 18 in the right image 16. This situation may occur, for example, when the left camera 10 is both vertically offset and rotated with respect to the right camera 12. Accordingly, the epipolar axis 26 is both skewed and offset with respect to the horizontal axis 20.

Clearly, a comparison of the pixels along the same horizontal rows of each image 14, 16 would not yield matching blocks for disparity calculations. A conventional approach would attempt to determine the skew and offset of each image 14,16 and precisely correct the orientation of the left image 14 by rotating the image 14 by five degrees and vertically shifting the image 14 by twenty pixels. However, as noted above, such an approach is typically too slow for real-time disparity calculations.

Figure 11:
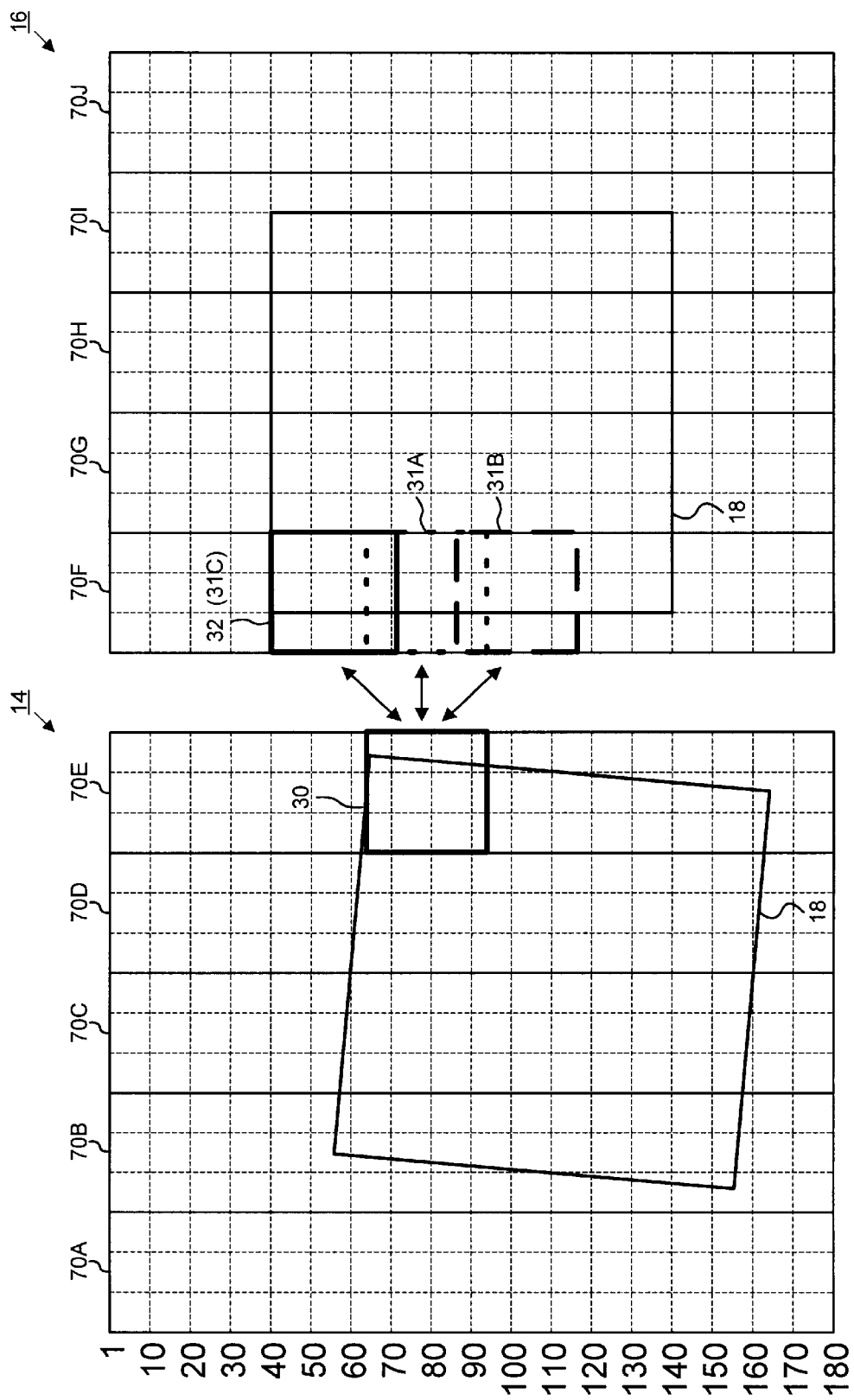
FIG. 11 is an illustration of a block comparison within a stereo image pair according to one embodiment of the invention.

Referring also to FIG. 11, after the partitioning process is complete, the region alignment module 55 vertically aligns each region 70 of the left image 14 with a corresponding region 70 of the right image. Throughout the following description, the regions 70 of the left image 14 are aligned with respect to the regions 70 of the right image 16. However, in an alternative embodiment, the regions 70 of the right image 16 are aligned with respect to the regions 70 the left image 14. In either case, the goal is a substantial vertical alignment of the regions 70 of each image 14,16 in order to facilitate disparity calculations along an aligned horizontal/epipolar axis 20, 26.

Initially, the block matching module 56 selects a block 30 of pixels from a first region 70 (such as region 70E) of the left image 14. Preferably, each block 30 is a section of a region 70, however the invention is not limited in this respect.

The block matching module 56 may select the block 30 in a variety of ways. For example, in one embodiment, the block 30 is selected at random. In another embodiment, the block 30 is selected at a predefined location within the region 70. In yet another embodiment, the block 30 is selected by identifying an area of abrupt change in pixel color, possibly indicating an edge of an object 18.

Once the block 30 is selected, the block matching module 56 locates a substantially matching block 32 in the corresponding region 70 (such as region 70F) of the right image 16. The block matching module 56 may use one or more standard block matching algorithms, well known to those skilled in the art, within the scope of the invention.

In one embodiment, the block matching algorithm is capable of calculating a similarity value, a distance, or a probability, each of which are measures of how closely the blocks 30, 32 match. For example, in one embodiment, the block matching algorithm calculates a Hamming distance between the blocks 30, 32, which is a distance measurement well known to those skilled in the art.

Figure 12:
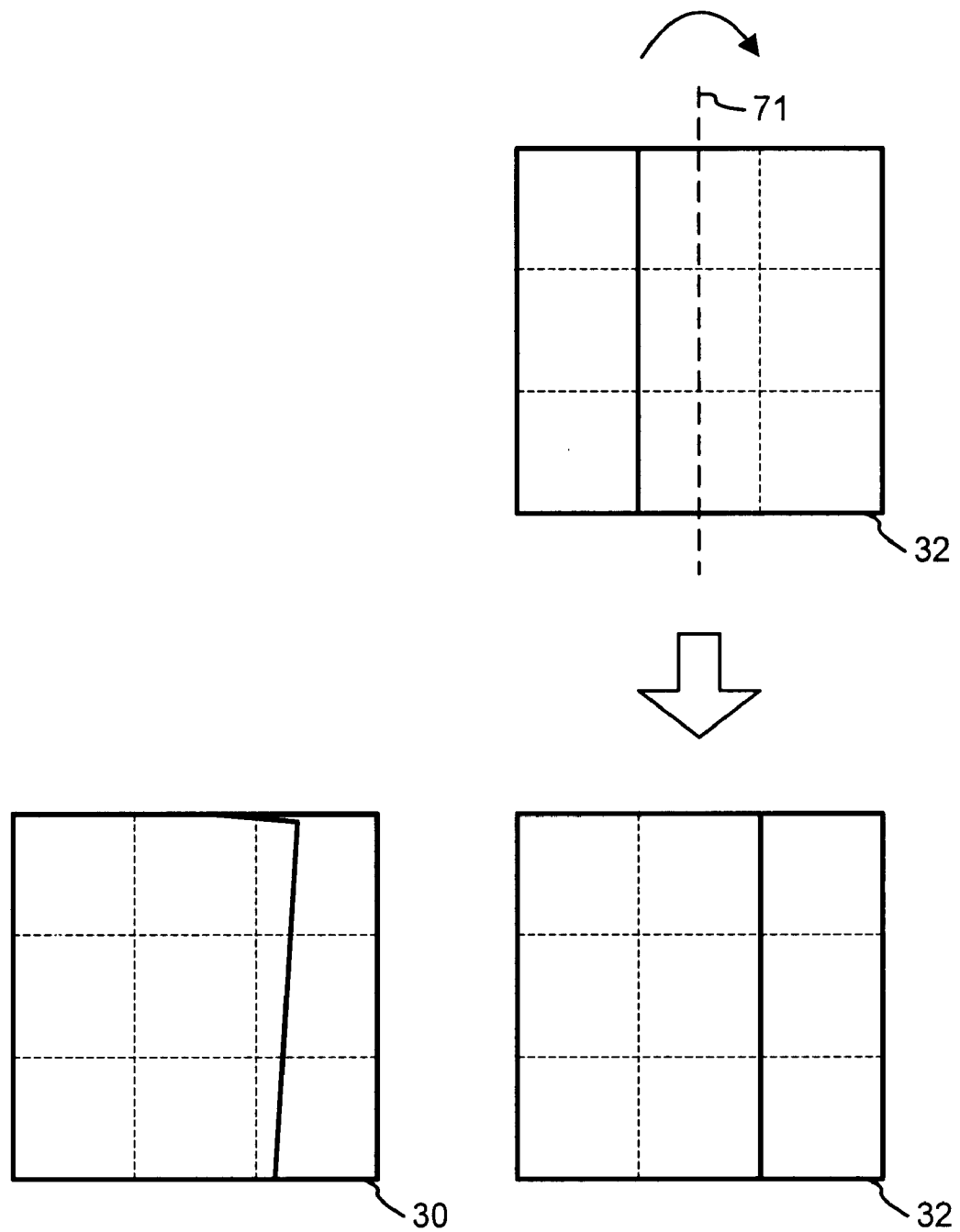
FIG. 12 is an illustration of blocks of pixels according to one embodiment of the invention.

Preferably, each block 30 in the left image 14 is compared to a vertically-flipped version of a block 32 in the right image 16. As shown in FIG. 12, the blocks 30, 32 are mirror images of each other. Therefore, for comparing the blocks 30, 32 using certain algorithms, the pixels of the block 32 must be vertically flipped over a vertical axis 71 as illustrated.

In one embodiment, the block matching algorithm employed by the block matching module 56 automatically compensates for the mirror image effect. In an alternative embodiment, the block matching module 56 vertically flips the block 32, as described above, before applying the block matching algorithm.

The term "substantially matching" is used herein because the blocks 30,32 may not perfectly match, pixel-for-pixel. Indeed, even if the cameras 10, 12 were perfectly aligned, image noise and other effects may prevent an exact match. Thus, the terms "substantially matching" or "matching," as used herein, refer to blocks 30, 32 of pixels having a sufficiently high similarity value or a sufficiently low distance. In other words, a sufficiently high probability exists that the blocks 30, 32 represent the same portion of the object 18 in each image 14, 16.

To find the matching block 32, the block matching module 56 preferably searches the corresponding region 70F of right image 16, beginning at the same horizontal rows occupied by the block 30. In other words, the block matching module 56 initially compares the block 30 in the left image 14 with a potentially matching block 31A (shown in dotted lines) in the right image 16.

Using conventional techniques, a similarity value, a distance, or a probability is then calculated between the block 30 and the block 31A. In one embodiment, if the similarity value is above a threshold (or if the probability is sufficiently high or the distance is sufficiently low), the block 31 A is designated as the matching block 32.

However, due to the effects of skew and offset, it is unlikely that the initial block 31A is a substantial match. Accordingly, the block matching module 56 preferably continues by comparing the block 30 with potentially matching blocks below (block 31B, shown in dashed lines) and above (block 31C, shown in solid lines) the initial block 31A, using an alternating walk with increasing vertical offsets from the initial block 31A. As illustrated in FIG. 11, potentially matching blocks 31 may overlap.

Although only three potentially matching blocks 31A–C are depicted, any number of blocks 31 may be compared until a similarity value, a distance, or a probability is found that satisfies the threshold. In one embodiment, if no such block 31 is found after a pre-determined number of comparisons, the most closely matching block 31 is designated as the matching block 32.

An example of the similarity values for the blocks 31A–C of FIG. 11 is shown in Table 1.

TABLE 1

| Block | Vertical Offset | Similarity |
| --- | --- | --- |
| 31A | 0 | 57 |
| 31B | +23 | 30 |
| 31C (32) | −23 | 91 |

For simplicity of description, only three similarity values are calculated in the depicted embodiment. Preferably, however, a number of additional similarity values are also calculated. As shown in Table 1, the block 31C has a relatively high similarity value. Thus, if the threshold is 90, for example, the block 31C is designated as the substantially matching block 32.

Once a substantially matching block 32 is found in the right image 16, the offset calculation module 58 calculates a vertical offset between the blocks 30, 32. In one embodiment, the vertical offset is an integer representing the number of pixel rows by which the region 70E in the left image 14 must be vertically shifted in order to vertically align the blocks 30, 32.

Preferably, the vertical offset is calculated by subtracting a row number associated with the block 32 from a row number with the block 30. Any of the rows may be used for this purpose, so long as the same row (e.g. first, last, middle, etc.) is used for each block 30, 32.

If the vertical offset is zero, the blocks 30, 32 (as well as the regions 70E, 70F) are perfectly aligned and no adjustment is required. Otherwise, the block 32 in the right image 16 is either higher or lower than the block 30 in the left image 14, requiring a vertical adjustment of the region 70E.

Figure 13:
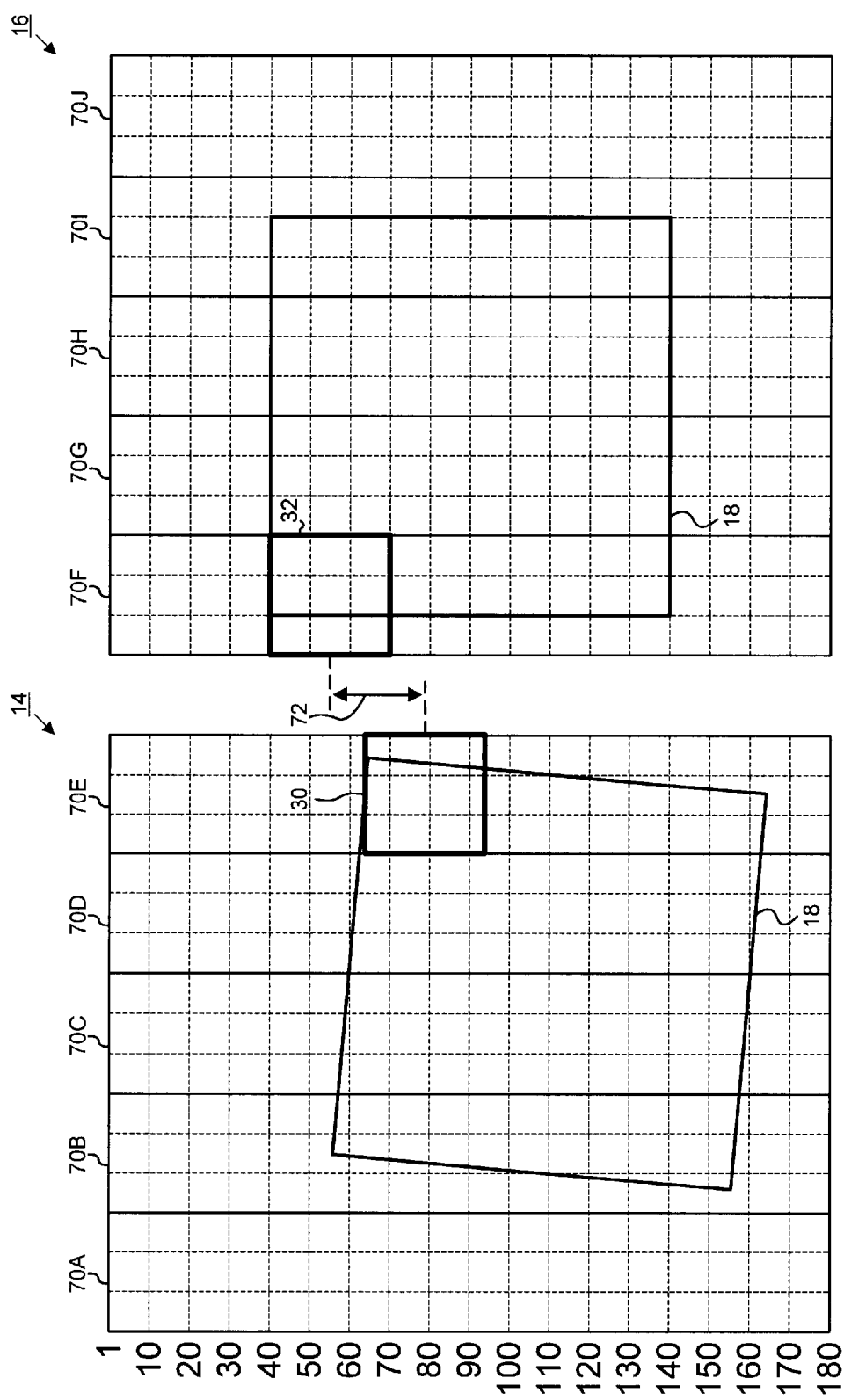
FIG. 13 is an illustration of a vertical offset calculation within a stereo image pair according to one embodiment of the invention.

Line 72 of FIG. 13 illustrates the vertical offset between the blocks 30, 32. Using the depicted row numbers, the calculated vertical offset is −23 (i.e. row 56–row 79). Thus, the region 70E must be upwardly shifted by 23 pixel rows in order to vertically align the matching blocks 30, 32.

In one embodiment, the vertical offset of the block 32 is previously determined by the block matching module 56, as shown in Table 1. Accordingly, a separate offset calculation module 58 may be superfluous. However, for clarity of description, the vertical offset is described herein as being calculated by the offset calculation module 58, although the functionality may be performed by the block matching module 56.

Figure 14:
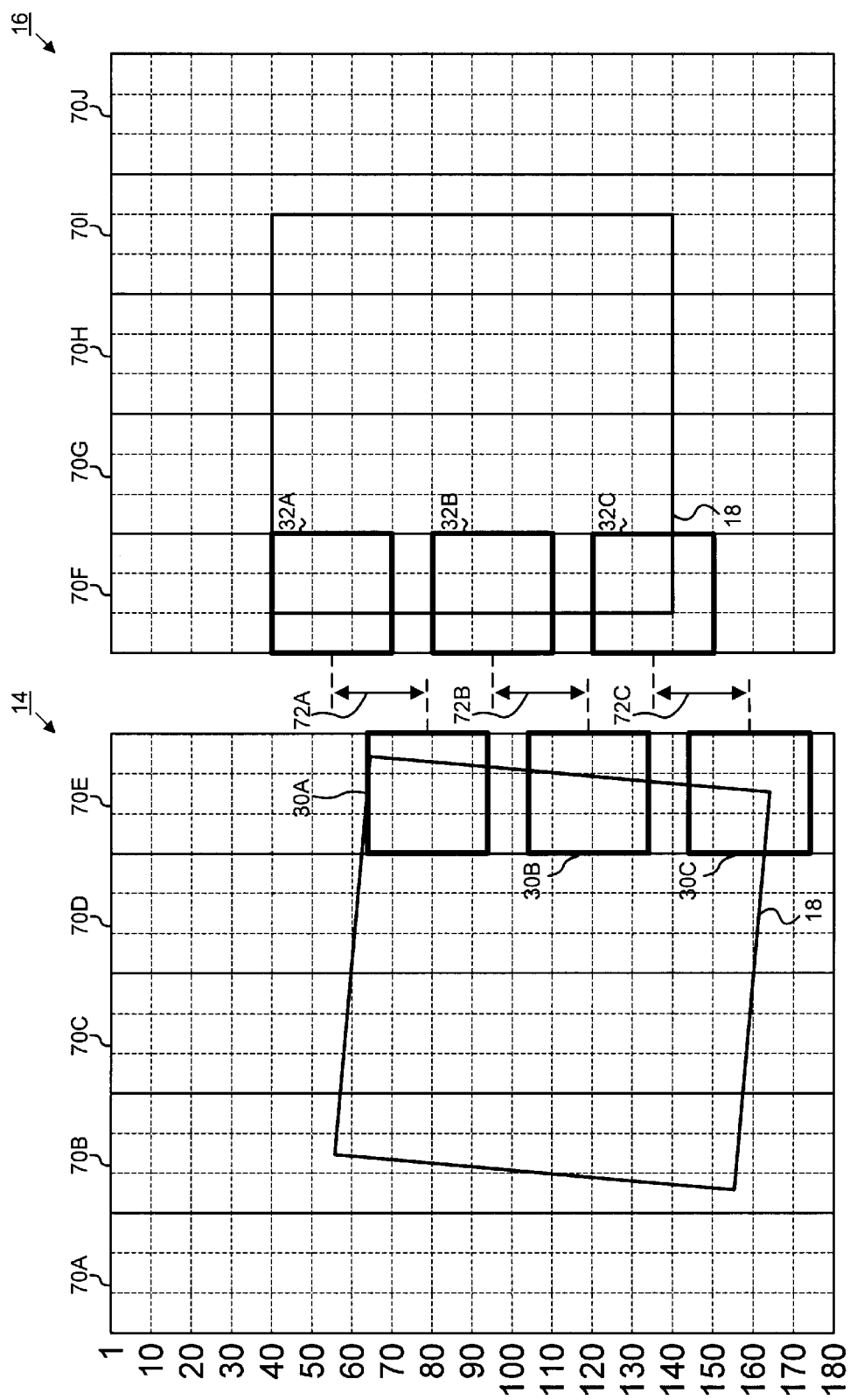
FIG. 14 is an illustration of a calculation of multiple vertical offsets within a stereo image pair according to one embodiment of the invention.

In many cases, it is unwise to match only two blocks 30, 32 and calculate therefrom only a single vertical offset. Occasionally, the blocks 30, 32 will match incorrectly, producing an invalid vertical offset. Thus, as shown in FIG. 14, the block matching module 56 preferably matches a plurality of blocks 30A–C, and the offset calculation module 56 calculates therefrom a plurality of vertical offsets. From the plurality of vertical offsets, a single offset may be chosen with a high degree of reliability.

For example, as shown in FIG. 14, the block 30A is preferably matched to the block 32A, the block 30B is preferably matched to the block 32B, and the block 30C is preferably matched to the block 32C. For each of the matching blocks 30A–C, 32A–C, corresponding lines 72A–C indicate the vertical offsets. Table 2 illustrates exemplary vertical offsets for the matching blocks 30A–C, 32A–C.

TABLE 2

| Matching Blocks | Vertical Offset |
| --- | --- |
| 30A, 32A | −23 |
| 30B, 32B | −22 |
| 30C, 32C | −24 |

As illustrated in Table 2, the calculated vertical offset for each pair of matching blocks 30A–C, 32A–C may be different. Accordingly, in one embodiment, the offset calculation module 56 calculates an average of the vertical offsets, preferably after excluding any of the vertical offsets that are substantially different from the others. For example, if an additional vertical offset was 78, it would be excluded from the average calculation. In Table 2, the average vertical offset −23, which is preferably the value provided to the region shifting module 60.

Figure 15:
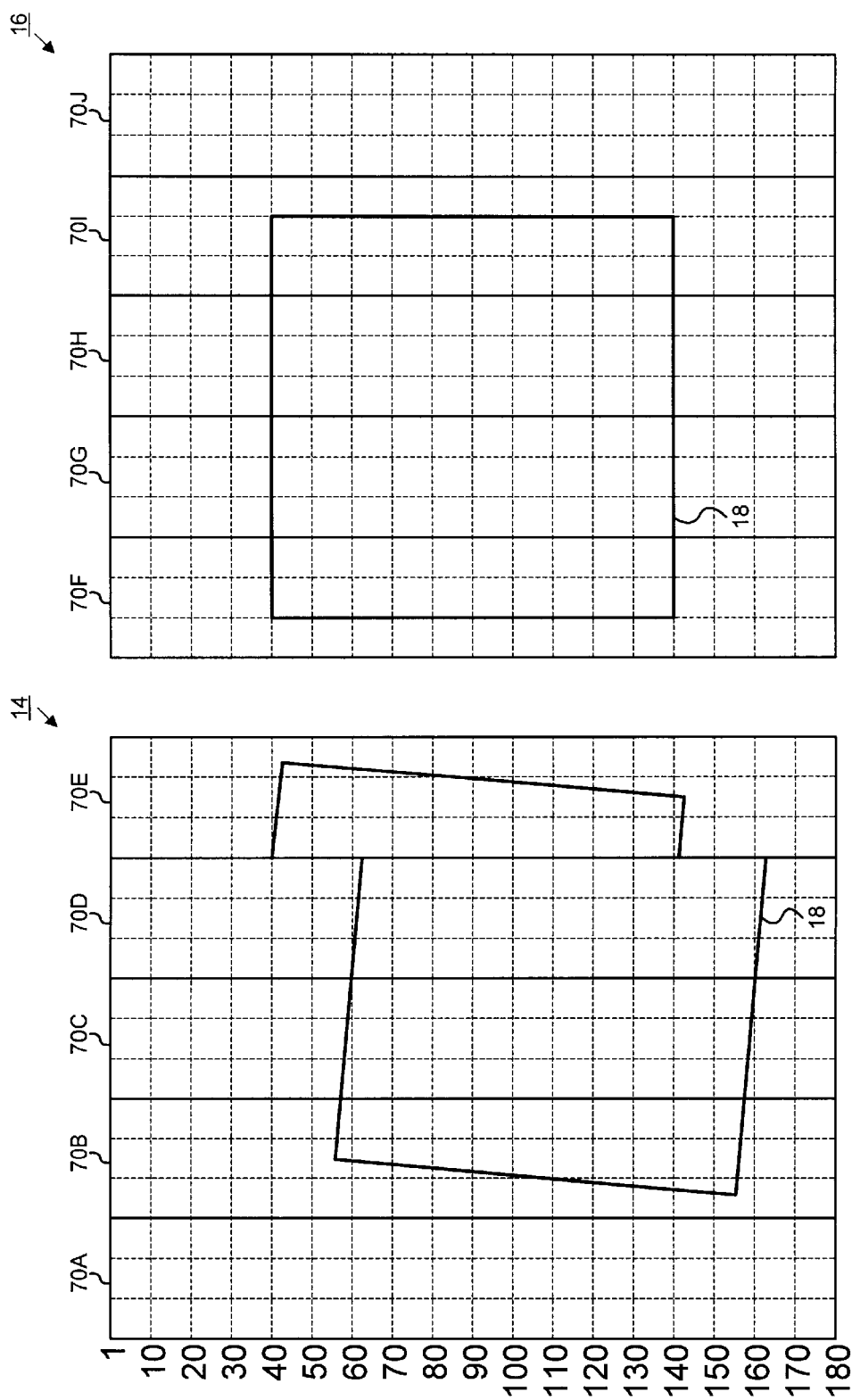
FIG. 15 is an illustration of a vertical shift of a region within a stereo image pair according to one embodiment of the invention.

Referring to FIG. 15, after the vertical offset is calculated, the region shifting module 60 vertically shifts the region 70E within the left image 14 according to the vertical offset. For example, if the vertical offset is zero, no shifting is required. However, if the vertical offset is positive (using the row numbering of FIG. 15), the region 70E is shifted downward (toward the bottom of the image 14) by the number of rows specified in the vertical offset.

If the vertical offset is negative, as in the depicted embodiment, the region is shifted upward (toward the top of the image 14) by the number of pixel rows specified in the vertical offset. Shifted rows of the region 70E extending beyond the top or the bottom of the image 14 (rows 1 and 180) are preferably discarded. FIG. 15 illustrates the left image 14 after the region 70E is shifted by the region shifting module 60.

After the first region 70E of the left image 14 is shifted, the above-described process of block matching, offset calculation, and region shifting is repeated for each of the other vertically striped regions 70A–D in the left image 14. Accordingly, each region 70 of the left image 14 is independently compared and shifted, if necessary, with respect to the corresponding region 70 of the right image 16.

Typically, the vertical offset will differ between regions 70. For example, Table 3 illustrates exemplary vertical offsets for the corresponding regions of FIG. 16.

TABLE 3

| Corresponding Regions | Vertical Offset |
| --- | --- |
| 70E, 70F | −23 |
| 70D, 70F | −21 |
| 70C, 70H | −19 |
| 70B, 70I | −16 |
| 70A, 70J | 0 |

Figure 16:
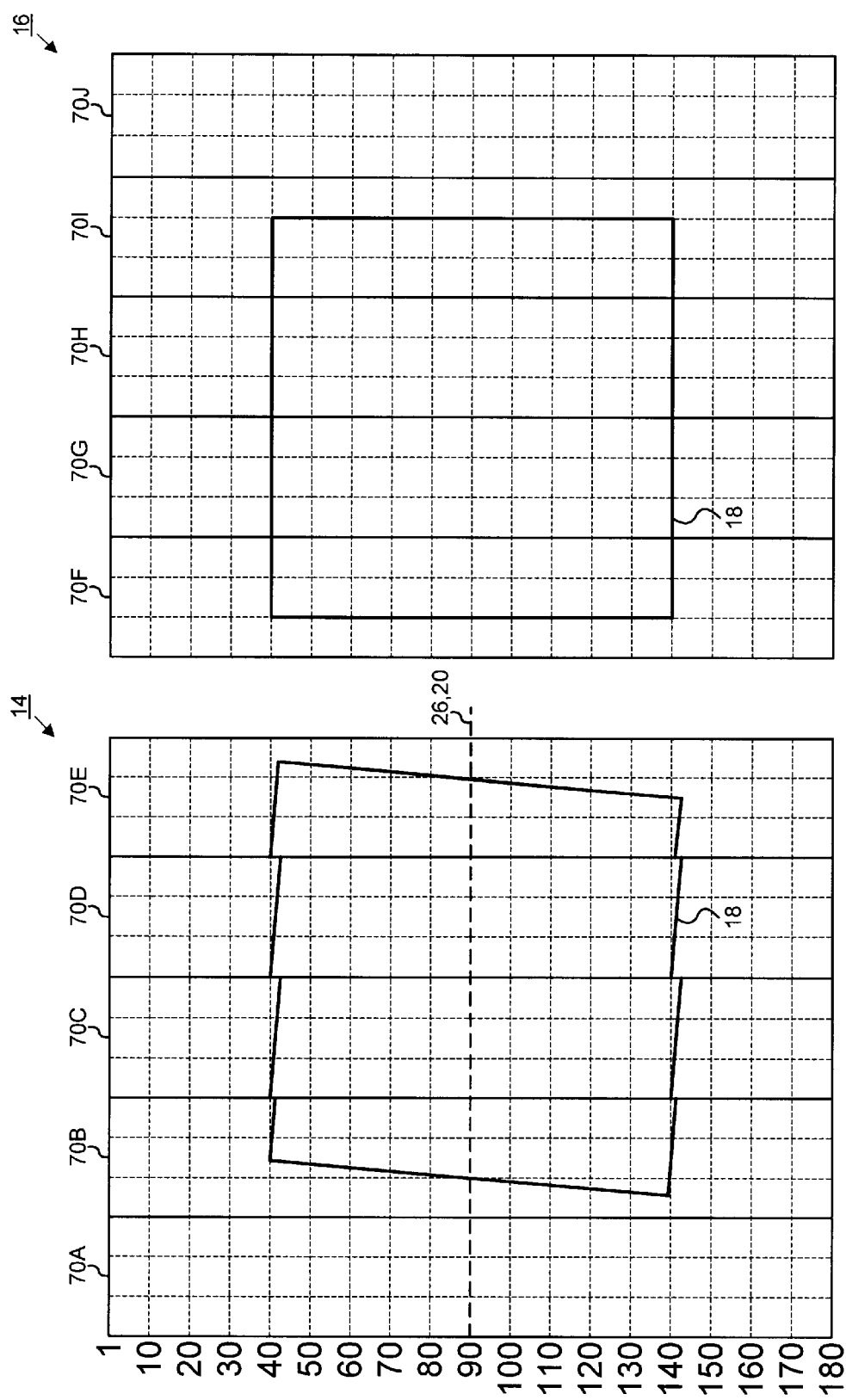
FIG. 16 is an illustration of a vertically shifted object according to one embodiment of the invention.

FIG. 16 illustrates the left image 14 after the region shifting module 60 has shifted all of the of the regions 70A–E according to the calculated vertical offsets. Clearly, the object 18 in the left image 14 is not identical to the object 18 in the right image 16. Nevertheless, the epipolar axis 26 is now corrected for skew and offset in order to closely approximate the horizontal axis 20, making disparity calculations possible.

Figure 17:
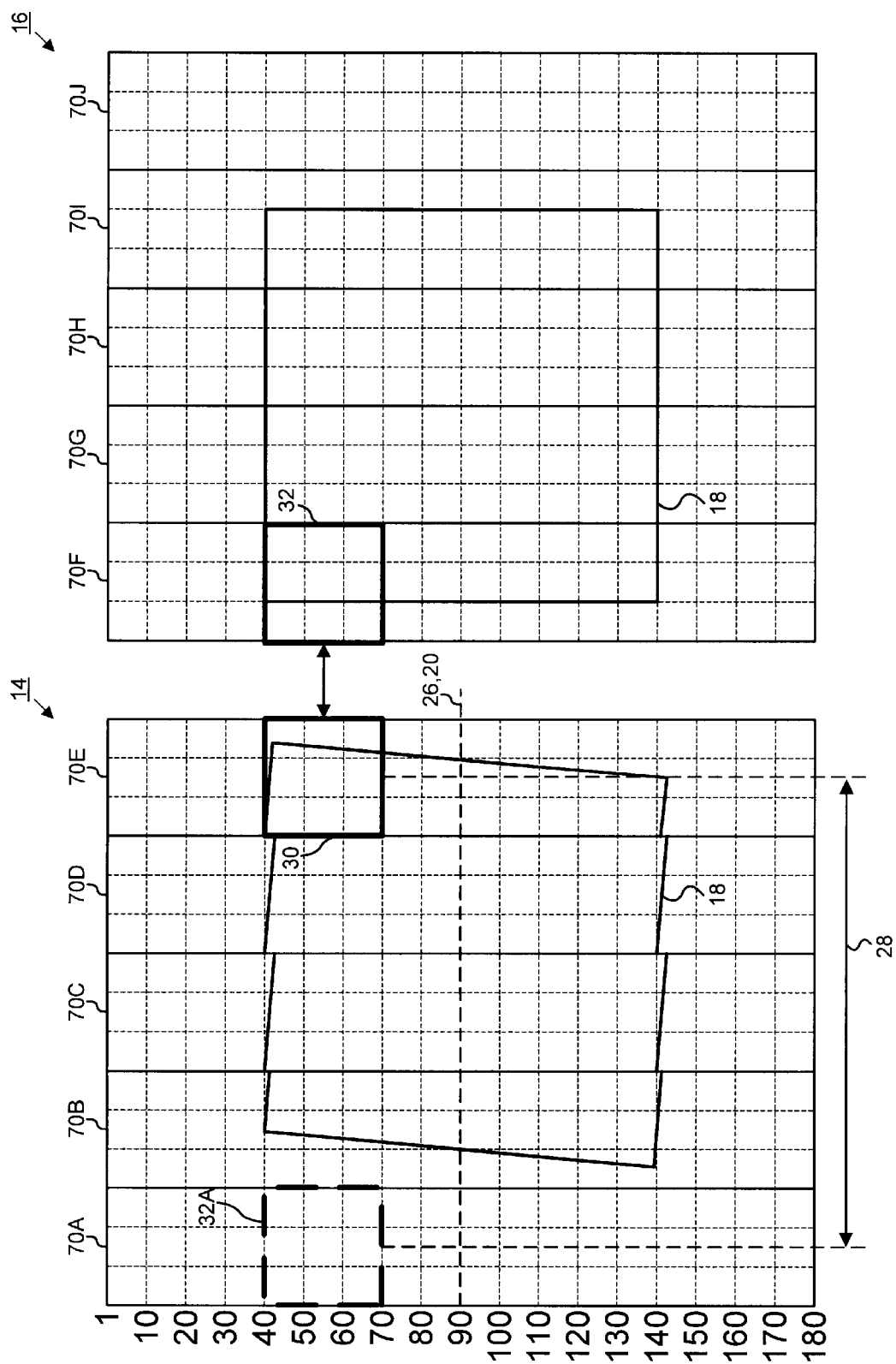
FIG. 17 is an illustration of a disparity calculation within a stereo image pair according to one embodiment of the invention.

After each of the regions 70 of the left image 14 have been vertically shifted, if necessary, the disparity calculation module 62 performs disparity calculations on the left and right images 14, 16. As illustrated in FIG. 17, blocks 30, 32 of pixels are preferably compared between corresponding regions 70 of the images 14, 16 along the same horizontal rows.

When matching blocks 30,32 are found, the disparity calculation module 62 calculates the horizontal translation between the block 30 and the block 32A, representing the location of the block 32 in the right image 16 and shown in dashed lines.

Line 28 indicates the horizontal translation, and, hence, the degree of disparity between the matching blocks 30, 32. In the depicted embodiment, the degree of disparity between the blocks 30, 32 corresponds to approximately 120 pixel columns.

From the resulting disparity data 74, the distance calculation module 64 and/or the edge detection module 66 may determine the distance and/or the edges of the object 18, respectively.

Figure 18:
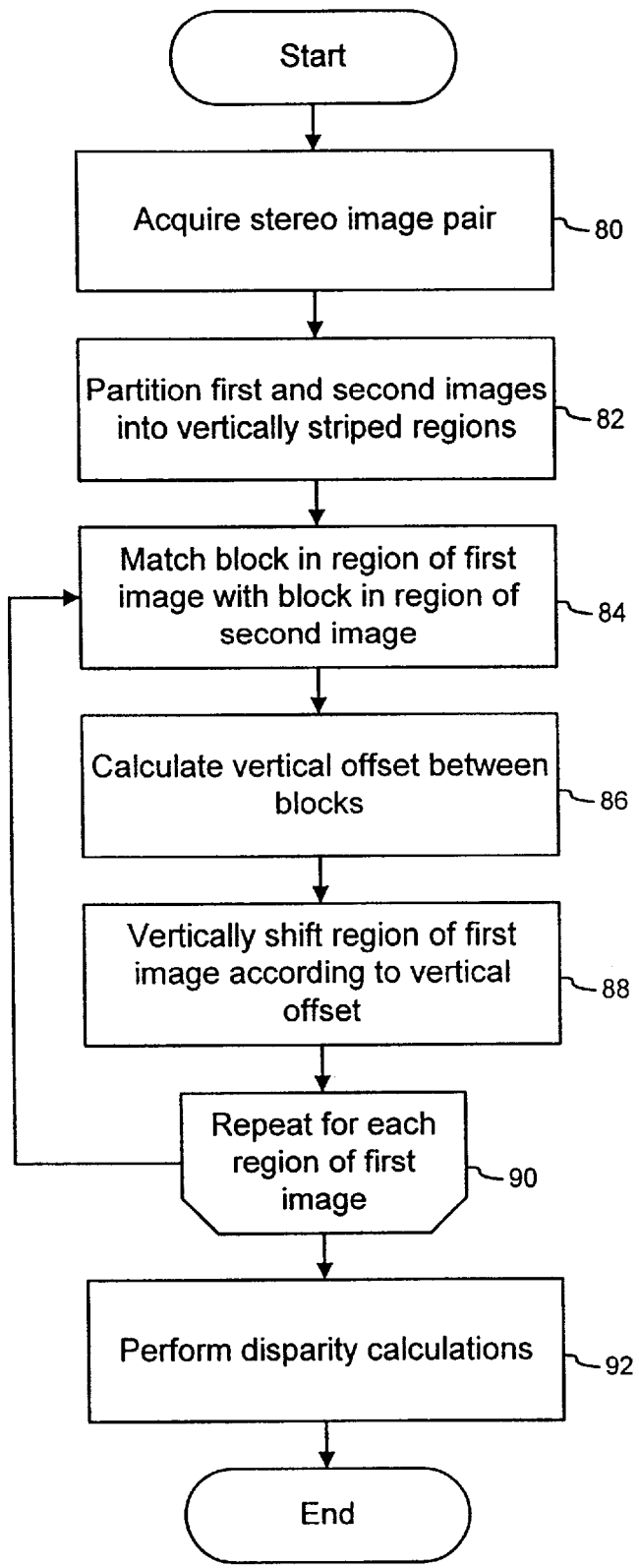
FIG. 18 is a schematic flow chart of a method for correcting an epipolar axis according to one embodiment of the invention.

Referring now to FIG. 18, a schematic flow chart illustrates a method for correcting an epipolar axis 26 in order to approximate a horizontal axis 20 for disparity calculations. The method begins by acquiring 80 first and second images of a stereo image pair 22. The first image may correspond to a left image 14, and the second image may correspond to a right image 16, or vice versa.

The method continues by partitioning 82 the first and second images into a plurality of vertically striped regions 70. Thereafter, a block 30 in a region 70 of the first image is matched 84 with a block 32 of a corresponding region 70 of the second image.

Next, a vertical offset 86 is calculated 86 between the matching blocks 30, 32, after which the region 70 of the first image is vertically shifted 88 according to the calculated vertical offset.

The method continues by repeating 90 steps 84, 86, and 88 for each region 70 of the first image. After all of the regions 70 of the first image are vertically shifted, the method concludes by performing 92 disparity calculations on the first and second images.

From the foregoing description, the present invention introduces an improved system and method for correcting an epipolar axis 26 for skew and offset that operates in essentially linear, i.e. O(N), time, greatly reducing the time required to correct an epipolar axis 26. Moreover, the methods of the present invention do not require complex calculations, such as image rotations and the like. Accordingly, the system of the present invention is suitable for implementation within a relatively simple hardware device.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer-implemented method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region;

vertically shifting the first region according to the calculated vertical offset to vertically align the substantially matching portions of the first and second regions;

repeating the identifying and calculating steps for at least two portions of the first region in order to calculate at least two vertical offsets; and determining an average of the at least two vertical offsets.

2. A computer-implemented method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region; and vertically shifting the first region according to the calculated vertical offset to vertically align the substantially matching portions of the first and second regions;

wherein each portion comprises a section of a vertically striped region.

3. A computer-implemented method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region by calculating a distance between a portion of the first region and at least two different portions of the second region, and identifying from among the at least two different portions the one having the least distance from the portion of the first region;

calculating a vertical offset between the portion of the first region and the substantially matching portion of the second region; and vertically shifting the first region according to the calculated vertical offset to vertically align the substantially matching portions of the first and second regions.

4. The method of claim 3, wherein the distance comprises a Hamming distance.

5. A computer-implemented method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region by calculating a similarity value between a portion of the first region and at least two different portions of the second region, and identifying from among the at least two different portions the one most similar to the portion of the first region;

calculating a vertical offset between the portion of the first region and the substantially matching portion of the second region; and vertically shifting the first region according to the calculated vertical offset to vertically align the substantially matching portions of the first and second regions.

6. A computer-implemented method for correcting an epipolar axis to approximate a horizontal axis, the epipolar axis associated with first and second images of a stereo image pair, where a first region of the first image corresponds to a second region of the second image, and where the first and second images comprise data arrays including rows and columns of pixels, each row and each column having an associated number, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region by identifying a first row number associated with the portion of the first region, identifying a second row number associated with the portion of the second region, and subtracting the second row number from the first row number; and vertically shifting the first region according to the calculated vertical offset to vertically align the substantially matching portions of the first and second regions.

7. A computer-implemented method for correcting an epipolar axis to approximate a horizontal axis, the epipolar axis associated with first and second images of a stereo image pair, where a first region of the first image corresponds to a second region of the second image, and where the first and second images comprise data arrays including rows and columns of pixels, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region; and vertically shifting the first region according to the calculated vertical offset to vertically align the substantially matching portions of the first and second regions by vertically shifting the first region with respect to the second region by an integral number of pixel rows corresponding to the vertical offset.

8. A computer-implemented method for correcting an epipolar axis to approximate a horizontal axis, the epipolar axis associated with first and second images of a stereo image pair, the method comprising:

partitioning the first and second images into a plurality of vertically striped regions, each region of the first image corresponding to a region of the second image; and vertically shifting a region of the first image in a direction calculated to vertically align a portion of the region with a substantially matching portion of the corresponding region calculating at least one disparity value between at least a portion of the vertically shifted region and at least a portion of the corresponding region; and calculating at least one disparity value between at least a portion of the vertically shifted region and at least a portion of the corresponding region.

9. A system for correcting an epipolar axis to approximate a horizontal axis, the epipolar axis associated with first and second images of a stereo image pair, where a first region of the first image corresponds to a second region of the second image, the method comprising:

a partitioning module configured to partition the first and second images into a plurality of vertically striped regions, each region of the first image corresponding to a region of the second image;

an alignment module configured to vertically shift a region of the first image in a direction calculated to vertically align a portion of the region with a substantially matching portion of the corresponding region;

a block matching module configured to identify a portion of the second region that substantially matches a portion of the first region;

an offset calculation module configured to calculate a vertical offset between the portion of the first region and the substantially matching portion of the second region, to calculate a second vertical offset between a second pair of substantially matching portions of the first and second regions, and to determine an average of the vertical offsets; and a region shifting module configured to vertically shift the first region according to the calculated vertical offset to vertically align the substantially matching portions of the first and second regions.

10. A system for correcting an epipolar axis to approximate a horizontal axis, the epipolar axis associated with first and second images of a stereo image pair, where a first region of the first image corresponds to a second region of the second image, the method comprising:

a partitioning module configured to partition the first and second images into a plurality of vertically striped regions, each region of the first image corresponding to a region of the second image;

an alignment module configured to vertically shift a region of the first image in a direction calculated to vertically align a portion of the region with a substantially matching portion of the corresponding region;

a block matching module configured to identify a portion of the second region that substantially matches a portion of the first region;

an offset calculation module configured to calculate a vertical offset between the portion of the first region and the substantially matching portion of the second region; and a region shifting module configured to vertically shift the first region according to the calculated vertical offset to vertically align the substantially matching portions of the first and second regions, wherein each portion comprises a section of a vertically striped region.

11. A system for correcting an epipolar axis to approximate a horizontal axis, the epipolar axis associated with first and second images of a stereo image pair, where a first region of the first image corresponds to a second region of the second image, the method comprising:

a partitioning module configured to partition the first and second images into a plurality of vertically striped regions, each region of the first image corresponding to a region of the second image;

an alignment module configured to vertically shift a region of the first image in a direction calculated to vertically align a portion of the region with a substantially matching portion of the corresponding region;

a block matching module configured to identify a portion of the second region that substantially matches a portion of the first region and to calculate a distance between a portion of the first region and at least two different portions of the second region, and identify from among the at least two different portions the one having the least distance from the portion of the first region;

an offset calculation module configured to calculate a vertical offset between the portion of the first region and the substantially matching portion of the second region; and a region shifting module configured to vertically shift the first region according to the calculated vertical offset to vertically align the substantially matching portions of the first and second regions.

12. The system of claim 11, wherein the distance comprises a Hamming distance.

13. A system for correcting an epipolar axis to approximate a horizontal axis, the epipolar axis associated with first and second images of a stereo image pair, where a first region of the first image corresponds to a second region of the second image, the method comprising:

a partitioning module configured to partition the first and second images into a plurality of vertically striped regions, each region of the first image corresponding to a region of the second image;

an alignment module configured to vertically shift a region of the first image in a direction calculated to vertically align a portion of the region with a substantially matching portion of the corresponding region;

a block matching module configured to identify a portion of the second region that substantially matches a portion of the first region and to calculate a distance between a portion of the first region and at least two different portions of the second region and identify from among the at least two different portions the one having the least distance from the portion of the first region;

an offset calculation module configured to calculate a vertical offset between the portion of the first region and the substantially matching portion of the second region; and a region shifting module configured to vertically shift the first region according to the calculated vertical offset to vertically align the substantially matching portions of the first and second regions.

14. A system for correcting an epipolar axis to approximate a horizontal axis, the epipolar axis associated with first and second images of a stereo image pair, where a first region of the first image corresponds to a second region of the second image, and where the first and second images comprise data arrays including rows and columns of pixels, each row and column having an associated number, the method comprising:

a partitioning module configured to partition the first and second images into a plurality of vertically striped regions, each region of the first image corresponding to a region of the second image;

an alignment module configured to vertically shift a region of the first image in a direction calculated to vertically align a portion of the region with a substantially matching portion of the corresponding region;

a block matching module configured to identify a portion of the second region that substantially matches a portion of the first region;

an offset calculation module configured to calculate a vertical offset between the portion of the first region and the substantially matching portion of the second region and to identify a first row number associated with the portion of the first region, identify a second row number associated with the portion of the second region, and subtract the second row number from the first row number; and a region shifting module configured to vertically shift the first region according to the calculated vertical offset to vertically align the substantially matching portions of the first and second regions.

15. A system for correcting an epipolar axis to approximate a horizontal axis, the epipolar axis associated with first and second images of a stereo image pair, where a first region of the first image corresponds to a second region of the second image, and where the first and second images comprise data arrays including rows and columns of pixels, the method comprising:

a partitioning module configured to partition the first and second images into a plurality of vertically striped regions, each region of the first image corresponding to a region of the second image;

an alignment module configured to vertically shift a region of the first image in a direction calculated to vertically align a portion of the region with a substantially matching portion of the corresponding region;

a block matching module configured to identify a portion of the second region that substantially matches a portion of the first region;

an offset calculation module configured to calculate a vertical offset between the portion of the first region and the substantially matching portion of the second region; and a region shifting module configured to vertically shift the first region according to the calculated vertical offset to vertically align the substantially matching portions of the first and second regions and to vertically shift the first region with respect to the second region by an integral number of pixel rows corresponding to the vertical offset.

16. A system for correcting an epipolar axis to approximate a horizontal axis, the epipolar axis associated with first and second images of a stereo image pair, where a first region of the first image corresponds to a second region of the second image, the method comprising:

a partitioning module configured to partition the first and second images into a plurality of vertically striped regions, each region of the first image corresponding to a region of the second image;

an alignment module configured to vertically shift a region of the first image in a direction calculated to vertically align a portion of the region with a substantially matching portion of the corresponding region; and a disparity calculation module configured to calculate at least one disparity value between at least a portion of the vertically shifted region and at least a portion of the corresponding region.

17. An article of manufacture comprising a program storage medium readable by a processor and embodying one or more instructions executable by the processor to perform a method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region;

vertically shifting the first region according to the calculated vertical offset to vertically align the substantially matching portions of the first and second regions;

repeating the identifying and calculating steps for at least two portions of the first region in order to calculate at least two vertical offsets; and determining an average of the at least two vertical offsets.

18. An article of manufacture comprising a program storage medium readable by a processor and embodying one or more instructions executable by the processor to perform a method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region;

vertically shifting the first region according to the calculated vertical offset to vertically align the substantially matching portions of the first and second regions wherein each portion comprises a section of a vertically striped region.

19. An article of manufacture comprising a program storage medium readable by a processor and embodying one or more instructions executable by the processor to perform a method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region by calculating a distance between a portion of the first region and at least two different portions of the second region, and identifying from among the at least two different portions the one having the least distance from the portion of the first region;

calculating a vertical offset between the portion of the first region and the substantially matching portion of the second region; and vertically shifting the first region according to the calculated vertical offset to vertically align the substantially matching portions of the first and second regions.

20. The article of manufacture of claim 19, wherein the distance comprises a Hamming distance.

21. An article of manufacture comprising a program storage medium readable by a processor and embodying one or more instructions executable by the processor to perform a method for correcting an epipolar axis to approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region by calculating a similarity value between a portion of the first region and at least two different portions of the second region, and identifying from among the at least two different portions the one most similar to the portion of the first region;

calculating a vertical offset between the portion of the first region and the substantially matching portion of the second region; and vertically shifting the first region according to the calculated vertical offset to vertically align the substantially matching portions of the first and second regions.

22. An article of manufacture comprising program storage medium readable by a processor and embodying one or more instructions executable by the processor to perform a method for correcting an epipolar axis to approximate a horizontal axis, the epipolar axis associated with first and second images of a stereo image pair, where a first region of the image corresponds to a second region of the second image, and where the first and second images comprise data arrays including rows and columns of pixels, each row and column having an associated number, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region by identifying a first row number associated with the portion of the first region, identifying a second row number associated with the portion of the second region, and subtracting the second row number from the first row number; and vertically shifting the first region according to the calculated vertical offset to vertically align the substantially matching portions of the first and second regions.

23. An article of manufacture comprising a program storage medium readable by a processor and embodying one or more instructions executable by the processor to perform a method for correcting an epipolar axis to approximate a horizontal axis, the epipolar axis associated with first and second images of a stereo image pair, where a first region of the first image corresponds to a second region of the second image, and where the first and second images comprise data arrays including rows and columns of pixels, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region;

identifying a portion of the second region that substantially matches a portion of the first region;

calculating a vertical offset between the portion of the first region and the substantially matching portion of the second region;

vertically shifting the first region according to the calculated vertical offset to vertically align the substantially matching portions of the first and second regions by vertically shifting the first region with respect to the second region by an integral number of pixel rows corresponding to the vertical offset.

24. An article of manufacture comprising a program storage medium readable by a processor and embodying one or more instructions executable by the processor to perform a method for correcting an epipolar axis approximate a horizontal axis, the epipolar axis associated with first and second images of a stereo image pair, where a first region of the first image corresponds to a second region of the second image, the method comprising:

partitioning the first and second images into a plurality of vertically striped regions, each region of the first image corresponding to a region of the second image;

vertically shifting a region of the first image in a direction calculated to vertically align a portion of the region with a substantially matching portion of the corresponding region; and calculating at least one disparity value between at least a portion of the vertically shifted region and at least a portion of the corresponding region.

\* \* \* \* \*

UNITED STATES PATENT AND TRADEMARK OFFICE
CERTIFICATE OF CORRECTION

PATENT NO. : 6,674,892 B1
DATED : January 6, 2004
INVENTOR(S) : Roger D. Melen

It is certified that error appears in the above-identified patent and that said Letters Patent is hereby corrected as shown below:

Column 1,
Line 33, "front one" should read -- front of one --.

Column 5,
Line 58, "such mice" should read -- such as mice --.

Column 8,
Line 50, "31 A" should read -- 31A --.

Column 10,
Line 56, "of the" should be deleted.

Column 19,
Line 4, "program" should read -- a program --; and
Line 9, "image" should read -- first image --.

Column 20,
Line 24, "approximate" should read -- to approximate --.

Signed and Sealed this

Twenty-fourth Day of August, 2004

JON W. DUDAS
*Director of the United States Patent and Trademark Office*